US012189516B2

(12) United States Patent
Hofmockel et al.

(10) Patent No.: US 12,189,516 B2
(45) Date of Patent: Jan. 7, 2025

(54) CONTROLLER FOR TESTING EXECUTABLE PROGRAM ELEMENT OF A VEHICLE FUNCTION, AND MOTOR VEHICLE COMPRISING A CONTROLLER

(71) Applicant: AUDI AG, Ingolstadt (DE)

(72) Inventors: Klaus Hofmockel, Reichertshausen (DE); Stefan Sicklinger, Passau (DE)

(73) Assignee: AUDI AG, Ingolstadt (DE)

( * ) Notice: Subject to any disclaimer, the term of this patent is extended or adjusted under 35 U.S.C. 154(b) by 96 days.

(21) Appl. No.: 17/918,786

(22) PCT Filed: Jan. 19, 2021

(86) PCT No.: PCT/EP2021/051076
§ 371 (c)(1),
(2) Date: Oct. 13, 2022

(87) PCT Pub. No.: WO2021/209175
PCT Pub. Date: Oct. 21, 2021

(65) Prior Publication Data
US 2023/0143265 A1 May 11, 2023

(30) Foreign Application Priority Data
Apr. 15, 2020 (DE) ..................... 10 2020 110 271.2

(51) Int. Cl.
G06F 11/36 (2006.01)
B60W 50/00 (2006.01)
(52) U.S. Cl.
CPC ......... G06F 11/3664 (2013.01); B60W 50/00 (2013.01)

(58) Field of Classification Search
CPC ........................... G06F 11/3664; B60W 50/00
See application file for complete search history.

(56) References Cited

U.S. PATENT DOCUMENTS 10,795,804 B1 * 10/2020 Nygaard ............. G06F 11/3684
2016/0140022 A1 * 5/2016 Michelsen ............. G06F 11/34
702/186

(Continued)

FOREIGN PATENT DOCUMENTS

DE 10319365 A1 11/2004
EP 3352079 A1 * 7/2018 ............. B60R 16/02
WO WO 2019/133824 A1 7/2019

OTHER PUBLICATIONS

Wikipedia's Linker (computing) historical version published Apr. 1, 2020 https://en.wikipedia.org/w/index.php?title=Linker_(computing)&oldid=948451417 (Year: 2020).*

(Continued)

Primary Examiner — Joseph O Schell
(74) Attorney, Agent, or Firm — STAAS & HALSEY LLP

(57) ABSTRACT

A controller for a vehicle (10) and a method of testing a program element of a vehicle function using the controller includes the controller having a computing device which runs a control program for controlling a vehicle function and a test environment with a control test program for testing at least one program element of a vehicle function. The test environment may be defined within a runtime environment delimited by the control program. The control test program may have a program interface which can integrate and run the at least one program element in a runtime of the control test program so that the control test program can test the at least one program element of the vehicle function.

13 Claims, 2 Drawing Sheets

(56) References Cited

U.S. PATENT DOCUMENTS

| | | | |
|---|---|---|---|
| 2018/0196732 A1 | 7/2018 | Dolev et al. | |
| 2019/0043278 A1* | 2/2019 | Stefan | G06Q 50/10 |
| 2019/0371091 A1* | 12/2019 | Frisch | G07C 5/0808 |
| 2020/0064229 A1* | 2/2020 | Kang | F02D 41/1401 |
| 2021/0185095 A1* | 6/2021 | Harel | G06F 9/45558 |

OTHER PUBLICATIONS

Okehee Goh et al.; "Schedulable Online Testing Framework for Real-Time Embedded Applications in VM"; Computer Science and Engineering Department, Arizona State University, Tempe, AZ, EUC 2007, LNCS 4808, pp. 730-741, 2007; IFIP; (12 pages).

Dominik Reinhardt; "An Embedded Hypervisor for Safety-Relevant Automotive E/E-Systems"; BNSDOCID:<XP_32636744_1>; (10 pages).

International Search Report (Form PCT/ISA/210); mailed Apr. 1, 2021 in corresponding PCT Application No. PCT/EP2021/051076 (4 pages) (3 pages English Translation).

Written Opinion (Form PCT/ISA/237); mailed Apr. 1, 2021 in corresponding PCT Application No. PCT/EP2021/051076 (7 pages).

Notification of Transmittal of Translation of the International Preliminary Report on Patentability (Form PCT/IB/338); mailed Oct. 20, 2022 in corresponding PCT Application No. PCT/EP2021/051076 (1 page).

International Preliminary Report on Patentability (Form PCT/IPEA/409); mailed Jul. 30, 2021 in corresponding PCT Application No. PCT/EP2021/051076 (8 pages).

Examination Report dated Oct. 29, 2020 in corresponding German Patent Application No. 10 2020 110 271.2 (7 pages).

PCT/EP2021/051076, Jan. 19, 2021, Klaus Hofmockel, AUDI AG Ingolstadt, DE.

10 2020 110 271.2, Apr. 15, 2020, Klaus Hofmockel, AUDI AG Ingolstadt, DE.

* cited by examiner

CONTROLLER FOR TESTING EXECUTABLE PROGRAM ELEMENT OF A VEHICLE FUNCTION, AND MOTOR VEHICLE COMPRISING A CONTROLLER

CROSS-REFERENCE TO RELATED APPLICATIONS

This application is a U.S. national stage of International Application No. PCT/EP2021/051076, filed on Jan. 19, 2021. The International Application claims the priority benefit of German Application No. 10 2020 110 271.0 filed on Apr. 15, 2020. Both the International Application and the German Application are incorporated by reference herein in their entirety.

FIELD

The present description relates to a controller for a vehicle, a method for testing a program element of a vehicle function, and a motor vehicle having such a controller.

BACKGROUND

In a current digital controller, software updates or changes must pass through a multi-stage integration, test/validation and approval process before they are released for a vehicle. Until now, a complete software release cycle, including a homologation, must have been passed through in order to provide new software, with all the associated risks, in the vehicle.

Even in the best case, a release process for a software change, including testing, validation, homologation and deployment in a vehicle, lasts at least several weeks. As a result of this fact, a fast test of new software, for example in respect of testing a new perception algorithm for a particular scenario when driving autonomously, is only possible every couple of weeks, which heavily delays a possible development advance, and cannot be adapted dynamically to upcoming change needs, for example specific deployment locations or environmental conditions.

One known way of achieving fast deployment and teaching new software in vehicles is the installation of a redundant set of hardware components, i.e. of controllers, in the vehicle in order to operate the new software disconnected from the active vehicle safety systems or driving functions. This approach, however, entails additional requirements in terms of costs, complexity and space requirement in the vehicle.

A computer system for a vehicle and a method for controlling the data traffic in such a computer system are known from DE 103 19 365 A1. Within a central computing unit, the computer system includes a delimited runtime environment in which application programs can run without having any effect on the runtime environment outside the delimited runtime environment.

A method and a system for testing and checking the correctness of a computer program during runtime are known from US 2018/0196732 A1. A reflexive code of a reflexive function is integrated here into a software module that executes the computer program. When desired, the reflexive code can be activated through an input, and the associated output is processed.

Systems and methods for the secure and protected updating of software are known from WO 2019/133824 A1.

SUMMARY

Described in the present description is a way to provide fast and secure testing of a new program element of a vehicle function, which may be achieved by the independent patent claims. Advantageous developments may be disclosed by the dependent patent claims, the present description and by the figures.

In an example, a controller for a vehicle with a computing apparatus may be provided to operate a control program for controlling a vehicle function and a test environment with a control test program for testing at least one program element of a vehicle function, wherein the test environment may be defined within a runtime environment that is delimited from the control program. The control test program may include a program interface to link and execute the at least one program element in a runtime of the control test program. The control test program may, furthermore, test the at least one program element of the vehicle function.

In other words, the controller may include a computing apparatus on which a control program and a control test program run. The computing apparatus can include a processor, a working memory and a data memory. The computing apparatus can receive and to process sensor data from vehicle functions. Vehicle functions can, for example, originate from a vehicle safety system of the vehicle, such as, for example, from a laser radar, a vehicle radar and a vehicle camera. The control program here can process data from the vehicle functions and operate vehicle functions depending on the results of the processing. For example, in a vehicle camera, an object in a movement trajectory of the vehicle can be recognized by the control program, whereupon the control program can automatically actuate a braking apparatus of the vehicle for braking purposes.

The control test program can include a program interface in which program elements can be linked and executed during the runtime of the control test program. The at least one program element can be a control software for at least one vehicle function, with which the vehicle function can be tested. The program element can, for example, be a new object detection algorithm of a vehicle camera, which is to be tested by the control test program. The program interface and the at least one program element may integrate the program element into the runtime of the control test program. As a result, the program element can be replaced while the controller and the control test program are in operation-what may be known as a "hot swap". For this purpose a plug-in mechanism can be provided that allows the program element, which can be compiled outside the computing apparatus, to be linked in quickly. The program element can, for this purpose, register autonomously via the program interface, wherein the program element can be checked for the program element's integrity by the control test program, and then instantiated. Shared libraries that can be loaded dynamically during the runtime can, for example, be used for the program element. Both the program element and the control test program can, for example, be based on a common programming language such as, for example, Java, C, C#, C++, Rust, Go and Python.

The test environment may be defined within a runtime environment that is delimited from the control program. As a result, the test environment may be operated in a test environment that is independent of the control program, so that the test environment and the control program do not affect one another. This can, for example, be achieved in that the test environment is run on a different processor or, within a virtual machine or virtual computer, whereby the control test program cannot have any effect on the control program. In particular, as a result of the delimitation of the test environment, hardware can also be used for the test environment that is not certified for automotive applications, whereby additional costs can be saved.

An advantage may be that new program elements for testing vehicle functions can be linked into the control test program quickly, which may be almost in real time, without the control program for controlling the vehicle functions being impaired. Safety of the controller can thus be maintained at all times during the test, without having to provide a redundant controller for the vehicle. A software prototyping environment for a plurality of possible vehicle functions, for example a surroundings perception, a map learning algorithm, an infotainment function and control functions of the vehicle may be quickly provided.

In comparison with the approach of the redundant provision of a controller, the described controller may only require a fraction of a data quantity and of additional system resources. Furthermore, the development time, what is known as the "big loop", and a feedback time for a developer, which may result that the time from the idea through to feedback from the idea implemented in the vehicle, can be sharply reduced, since the developer can receive feedback from the vehicle almost in real time as to whether the idea implemented in the program element works. In addition, the need for large quantities of raw data to be examined for evaluation can thus be avoided; the program element is able, rather, only to process the necessary data of the vehicle functions, which limits a data quantity to the essential information, and thus improves efficiency.

Examples through which additional advantages may result also belong to an invention.

In an example, the control test program only has read access to the vehicle function. In other words, the control test program cannot actuate the vehicle function to carry out a function, but can only read and process data of the vehicle function. This example entails the advantage that the control test program cannot change or initiate any vehicle functions, and no incorrect control commands can be issued by a potentially faulty program element. Safety of the controller can thus be improved.

In a further example, the test environment may be created virtually within the computing apparatus by a delimited runtime environment, while the delimited runtime environment has no effect on a runtime environment of the control program. In other words, no separate hardware is provided for the test environment. The test environment may run together with the control program on the computing apparatus, while the test environment may be generated virtually by software in a different, delimited runtime environment. The delimited runtime environment can be conceived of as an isolated, virtual container, whose code is only executed within the test environment, and which has no effect on the control program. This may also be referred to as a sandbox. Computing apparatus resources are assigned here to the sandbox or test environment, without however having an effect on the computing apparatus and its operating system or on the control program. This example entails the advantage that a test environment for testing the program element can be generated without needing a redundant controller. The safety can, furthermore, be increased, since the delimited runtime environment does not affect the runtime environment of the control program.

In a further example, the control test program may include an event detector to recognize a predefined test condition in data of the vehicle functions, and to start the program element of the control test program on recognition of the predefined test condition. In other words, the event detector can recognize a predefined test condition in data of all the vehicle functions, and thereupon execute the program element of the vehicle function for testing purposes. It can, for example, be provided that the program element is only executed when a specific situation occurs, i.e. the predefined test condition. The event detector here can examine the data of all vehicle functions, i.e. not only those of the function to be tested. Particularly, the event detector, which can also be known as a scheduler, can select the program element that matches the predefined test condition from a plurality of program elements. The predefined test condition can, for example, include the fact that a rain sensor of the vehicle detects wetness, whereupon the event detector can execute a program element for testing a vehicle camera when wet. Multiple program elements can be executed in parallel. This example entails the advantage that test data may only be generated when the predefined test condition occurs. A data quantity, and thereby a memory space requirement, can be reduced in this way.

In a further example, the computing apparatus comprises a computing unit dedicated to the test environment. In other words, the computing apparatus can be equipped with hardware that is designated for the test environment. These computing resources are reserved exclusively for the control test program and the at least one program element that is to be tested within the delimited runtime environment. The dedicated computing unit can, for example, comprise one or more processors, a working memory and a non-volatile data memory. These can be provided as an embedded computing unit within the computing apparatus. The dedicated computing unit is not, however, configured as a duplicated controller for testing, which means that controllers of the vehicle functions and data connections, such as Ethernet, CAN, FlexRay and so forth, do not have to be duplicated. The dedicated computing unit may be conceived of exclusively as a processing unit that can execute an algorithm within the delimited runtime environment, and which can save test data from it. This example entails the advantage that hardware resources for the delimited runtime environment can be kept small, and that hardware—and thereby computing power—for the control program are not affected. A powerful and efficient test environment can thus be generated with minimum use of materials.

in a further example, the controller comprises a communication device to provide a wireless communication connection to the test environment. In other words, a communication device is provided by which the test environment can be accessed via a wireless communication connection. The communication device can, for example, comprise a mobile telephone module or a WLAN module that enables a wireless exchange of data. This example entails the advantage that the test environment can be accessed from outside without having to establish a wired connection. The test environment can in this way be accessed more quickly and more dynamically from anywhere, which may increase the speed of the test process.

In an example, the test data acquired by the control test program can be saved in the test environment, and that the test environment is to provide the test data to the communication device for transmission to an evaluation device outside the vehicle. In other words, the test environment can comprise a data memory that stores the test data acquired by the control test program. These test data can then be provided to the communication device which is designed to transmit the test data. The test data can be transmitted to an evaluation device outside the vehicle, for example to a developer of the controller or of the at least one program element, who can then carry out a further evaluation or assessment of the test data. This example entails the advantage that necessary test data can automatically be transmitted out of the test environment as soon as the test data have been recorded. The speed in an evaluation process of the program element can hereby be accelerated.

In an example, the control test program is to recognize a predefined vehicle status in data of the vehicle functions, and to obtain, via the wireless communication connection, at least one predefined program element that is associated with the predefined vehicle status. In other words, the control test program can request at least one predefined program element that is associated with a predefined vehicle status. The predefined vehicle status can, for example, be recognized by the control test program from data of the vehicle functions. The predefined vehicle status can be a vehicle state, a vehicle model, a location of the vehicle, a speed, a version of the control program, and other variations of the vehicle status. The predefined program element can then be downloaded in accordance with the predefined vehicle status that has been recognized. A predefined vehicle status can thus, for example, be that the vehicle is moving in a region with low temperatures. A program for testing an electronic stability program can thereupon be linked into the control test program as a predefined program element by the program interface in order to check the behavior of this predefined program element at low temperatures. This example entails the advantage that the program elements to be tested are only then provided in a variable manner when the test environment, i.e. the vehicle status, also corresponds to the test conditions. Unnecessary test data can be avoided in this way, whereby faster and more accurate testing can be performed.

A method for testing a program element of a vehicle function may also be provided according to the example, wherein a control program for controlling vehicle functions and a test environment with a control test program for testing the at least one program element of the vehicle function is provided, wherein the test environment runs within a runtime environment that is delimited from the control program, wherein, through a program interface of the control test program, at least one program element is linked into a runtime of the control test program and executed, and wherein the vehicle function is tested by the at least one program element. The test environment can be provided in a computing apparatus in the vehicle, in particular in the computing apparatus in which the control program for controlling vehicle functions is provided. Alternatively or in addition, sensor data and/or actuator data can be transmitted to an evaluation device outside the vehicle, wherein the evaluation device outside the vehicle can comprise the test environment, and the test of the vehicle functions can be carried out by the program element, and therefore outside the vehicle. This entails the same advantages and possible variations as with the controller.

An example relates to a motor vehicle having a controller according to one of the described examples.

The control apparatus for the motor vehicle comprises a processor device that is configured to carry out an the method according to the described examples. The processor device can for this purpose comprise at least one microprocessor and/or at least one microcontroller and/or at least one FPGA (field programmable gate array) and/or at least one DSP (digital signal processor). The processor device can, furthermore, comprise program code to carry out the method according to the described examples when executed by the processor device. The program code can be saved in a data memory of the processor device.

The described examples also include developments of the method according to the described examples which have features as have already been described in connection with the developments of the controller according to the described example. For this reason, the corresponding developments of the method may not be described here again.

The motor vehicle according to the described examples may be a passenger car or truck, or a passenger bus or motorcycle.

The described examples also encompass the combinations of the features of the described examples.

BRIEF DESCRIPTION OF THE DRAWINGS

These and other aspects and advantages will become more apparent and more readily appreciated from the following description of the examples, taken in conjunction with the accompanying drawings of which.

DETAILED DESCRIPTION

The examples described below are examples of the invention. In the examples, the described components of the examples each represent individual features that may be considered independently of one another, each of which may also develop the examples independently of one another. The disclosure should therefore also include combinations of the features of the examples other than those illustrated. The examples described can, moreover, also be extended by further ones of the features of the examples that have already been described.

The same reference signs in the figures each identify elements with the same function.

Figure 1:
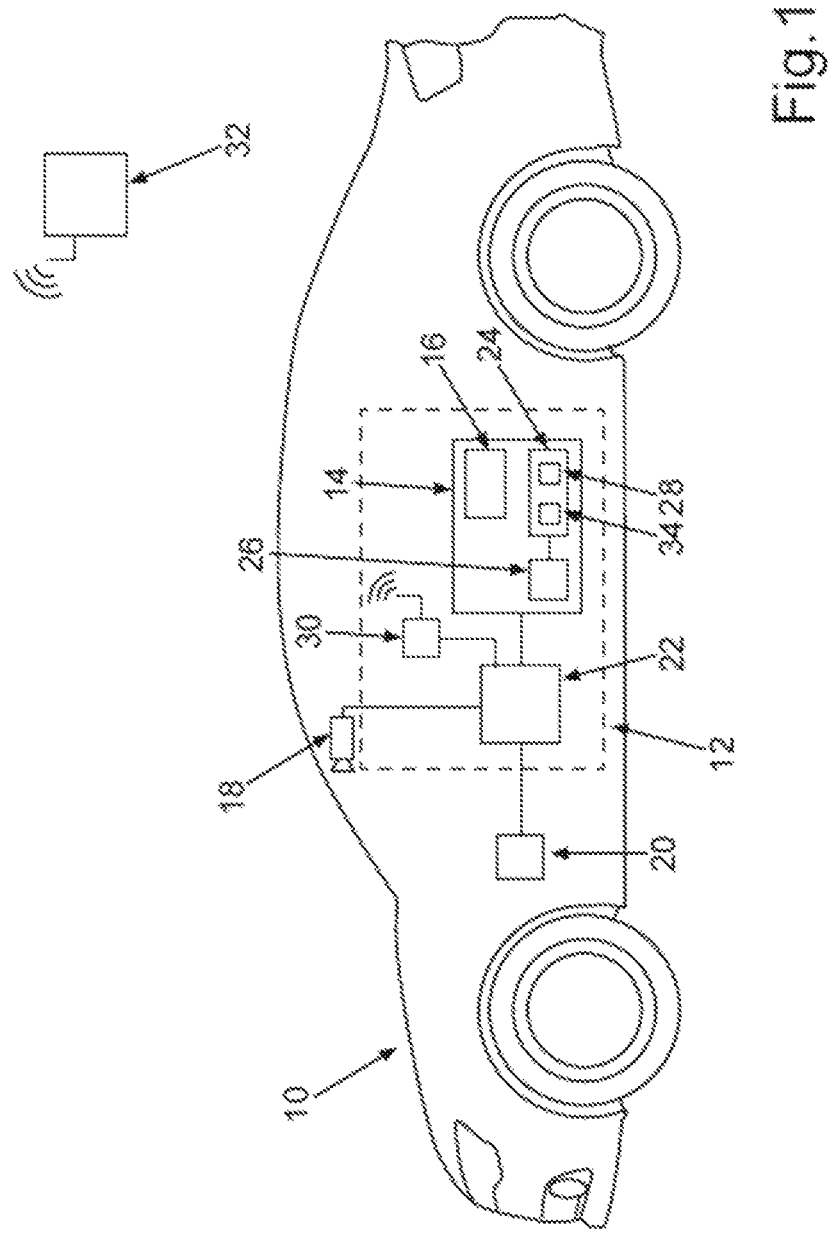
FIG. 1 shows a motor vehicle having a controller according to an example.

FIG. 1 shows a motor vehicle 10 having a schematic controller 12 according to an example. The controller 12 comprises a computing apparatus 14, wherein the computing apparatus 14 can comprise a control program 16 for controlling at least one vehicle function.

A vehicle function can, for example, be a function of a vehicle camera 18 or of a sensor 20 which can, for example, be a brightness sensor or a rain sensor. When the motor vehicle 10 is operating, the sensor 20 and the vehicle camera 18 can, for example, transmit data to a central gateway 22 of the controller 12. The central gateway can, for example, establish access to different connection technologies, such as, for example, Ethernet, CAN and/or FlexRay. The data of the vehicle functions 18, 20 can then be made available to the computing apparatus 14, in particular to the control program 16. The control program 16 can then process the data of the vehicle functions 18, 20 and, when appropriate, operate the vehicle functions 18, 20 with new control commands.

Updating the control program or testing a new control program may, however, not be possible without difficulty, and may involve a great deal of effort. For example, a new software would have to be tested and validated before the new software could be loaded onto the computing apparatus 14 to replace the control program 16.

To accelerate this testing process, a test environment with a control test program 24 can additionally be provided in the computing apparatus 14. The control test program 24 can be defined in a runtime environment that is delimited from the control program 16. In an example, the test environment can be provided virtually within the computing apparatus 14 by the delimited runtime environment, wherein the delimited runtime environment of the control test program 24 has no effect on the runtime environment of the control program 16, and in particular only has read access to the vehicle functions 18, 20, that is to say to the data of the vehicle functions 18, 20. In other words, the test environment can be what is known as a sandbox, in which new software can be tested safely without affecting the flow of the control program 16. New software can thus be tested and validated within the delimited runtime environment, before the control program 16 is updated with the new software.

The computing apparatus 14 can have a dedicated computing unit 26 for the test environment which, for example, can comprise a processor in order to be able to provide additional computing capacity to the test program 24. In this way, for example, a computing capacity of the control program 16 can remain unaffected by a division of computing resources of the computing apparatus 14.

In an example, the control test program 24 can comprise a program interface that is designed to link and execute at least one program element 28 during a runtime of the control test program 24. This means that the program interface provides an embedded plug-in system for the test environment, by which the program element 28 can be linked into the control test program 24. The test environment can provide a buffer memory (cache) for this purpose, and the program element can comprise an implementation of the software to be tested of the vehicle function. The program element can be compiled outside the computing apparatus 14, and can be linked during a runtime via the program interface.

The program element, i.e. the plug-in object, can be examined for its integrity at the program interface, and then initiated. It can also be provided that a plurality of program elements run in parallel. The program elements may usually be very small binary files that can comprise the programs for the various vehicle functions.

To link the program element 28 into the control test program 24, the controller 12 can, for example, comprise a communication device 30 that is designed to establish a wireless communication connection. The communication device 30 can, in particular, establish a connection to an evaluation device 32 outside the vehicle which can, for example, be a server or a cloud system. The program element 28 can be transmitted via this connection to the communication device 30, wherein the program element 28 can be forwarded to the computing apparatus 14 via the central gateway 22, where the program element 28 can then be linked at the program interface of the control test program 24 during a runtime of the control test program 24.

The program element 28 to be tested can thus be linked in quickly, whereby a test process can be accelerated. The program element 28 linked in in this way can be made available almost in real time via the wireless communication connection, and the control test program 24 can be adapted to specific requirements with minimum delay by the program element 28. The program element 28 can, for example, comprise a large number of different data, algorithms, values, configurations or settings that can be used to test various tasks of the controller 12, such as, for example, a configuration of the controller, setting of triggers and/or collection of data.

The test data ascertained in this way can be temporarily saved in the test environment in a non-volatile memory and transmitted, for example automatically, via the communication device 30 to the evaluation device 32 that is outside the vehicle after the program element 28 has been executed. Alternatively, test data can also be transmitted in real time to the evaluation device 32 that is outside the vehicle without intermediate storage.

The control test program 24 can comprise an event detector 34. The event detector, or scheduler, can examine data of the vehicle functions 18, 20, for example for a predefined test condition. If this predefined test condition arises, the event detector 34 can actuate the control test program 24 to execute the program element 28. The event detector can, for example, be a program that reads in the data of the vehicle functions 18, 20 and compares them with the predefined test condition which can, for example, comprise a threshold value. If one of the values of the data of the vehicle functions rises above or falls below the threshold value of the predefined test condition, the program element 28 can be started.

In an example, the sensor 20 can, for example, be a brightness sensor. The predefined test condition can, for example, be that a signal of the brightness sensor 20 falls below a predefined brightness value and, for example, indicates darkness. If this is the case, the event detector 34 can start the program element 28 which is, for example, a program for an object recognition from camera data of the vehicle camera 18, in order to check how well the algorithm of the program element 28 recognizes objects in a dark environment. The test data ascertained in this way can then be transmitted to the evaluation device 32 outside the vehicle via the communication device 30.

In an example, a predefined vehicle status may also be recognized from the data of the vehicle functions 18, 20. This can, for example, also be performed by the event detector 34. A vehicle-specific state is meant by the predefined vehicle status, such as for example a configuration of vehicle functions and/or hardware of the motor vehicle 10. Specific vehicle functions, such as, for example, functions for autonomous driving, can be tested by the program element 28. In this case, however, executing the program element 28 in vehicles that are not operated autonomously would be unnecessary, and would lead to unusable test data. To avoid this, when the predefined vehicle status is recognized, a predefined program element that is to be tested can be downloaded by the control test program 24 automatically, for example from the evaluation device 32 outside the vehicle, wherein the predefined program element can, for example, be executed by the event detector 34 when the predefined test condition occurs.

The test process can thus be individualized, and adapted for specific vehicles in specific scenarios. Large quantities of raw data that are transmitted to the evaluation device 32 outside the vehicle can, moreover, be avoided, since only the test data that is needed for the specific vehicle is obtained by the program element 28.

Figure 2:
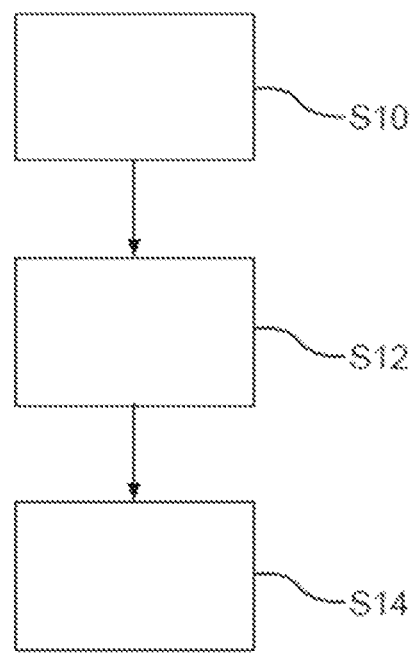
FIG. 2 shows a schematic method flowchart according to an example.

A schematic flowchart for testing a program element of a vehicle function according to an example is illustrated in FIG. 2, wherein a control program 16 for controlling vehicle functions 18, 20 and a test environment with a control test program 24 for testing at least one program element 28 of a vehicle function is provided. In a step S10, the test environment is operated within a runtime environment delimited from the control program 16. In a step S12, at least one program element 28 is linked and executed in a runtime of the control test program 24 by a program interface of the control test program 24. In a step S14, a vehicle function, which can be predefined by the program element 28, is tested by the at least one program element 28. The test data obtained from this can then be analyzed for further evaluation.

Another example is that of implementing a sandbox (test environment) within the respective electronic vehicle system (controller 12, ECU). This sandbox can comprise software and hardware elements that make it possible to place a new software function (e.g. an algorithm) into a delimited runtime environment by a program element 28. This sandbox has a special plug-in mechanism that makes it possible to replace software components (the program element 28) remotely via over-the-air update mechanisms during operation of the system, also referred to as a "hot swap". The sandbox concept guarantees a safe operating environment for new software that cannot under any circumstances impair the safety of the running system, and is entirely separate at all times. The sandbox only has read access to all necessary vehicle systems and data.

As a result of this separation by way of the sandbox, the download of specific unproven, untested or otherwise unapproved software elements (program element 28), e.g. an "alpha version", may bypass the established approval process, and can be transferred to the vehicle 10. The software elements employed can be modified, almost in real time, by the over-the-air access, and adapted to specific needs with minimum delay. These software elements can contain a wide range of different elements, for example data, algorithms, values, configurations and settings, that can be used to perform various tasks in the vehicle, such as, for example, configuration of the system, setting of triggers and data acquisition.

One of many applications for the operation of this sandbox is, for example, the testing of a new algorithm for recognizing a particular object in a video stream. The introduced algorithm (program element 28) to be tested may run in the sandbox in parallel with the existing algorithm (control program 16), which introduced algorithm may be tested, verified, homologized and released, and has access to precisely the same information from the respective electronic system; i.e. from the sensors 18, 20. Every new behavior, or every new item of information, that may be learned or collected from the new algorithm can be saved in the sandbox and then uploaded, almost in real time, to a cloud system (evaluation device 32 outside the vehicle) of the manufacturer.

This uploaded information (test data, training data and measurement data) can then be used immediately as real-time feedback for further tests and the evaluation of the program element 28 that is under development. This enables a fast software prototyping environment in a large number of possible applications, for example perception, map learning, infotainment and control systems. This concept may require only a fraction of additional system resources when compared with the concept of duplicating the system. The deployment cycle time, also known as the "big loop", may be reduced from several weeks down to milliseconds.

In addition, the deployment process can be individualized, and adapted to specific vehicles in specific scenarios, for example to a location, the weather, a vehicle state and/or a vehicle configuration. This contrasts with other methods, in which large quantities of raw data may be collected and saved in a cloud for further processing. The method shown enables a reduction in the collected data quantity to the absolutely essential desired information, and permits highly efficient utilization of the communication channels and the cloud storage resources.

Altogether, the examples show how an automated, bidirectional and near-real-time test environment, employing a sandbox and an embedded plug-in system, can be made available.

A description has been provided with particular reference to examples, but it will be understood that variations and modifications can be effected within the spirit and scope of the claims, which may include the phrase "at least one of A, B and C" as an alternative expression that refers to one or more of A, B or C, contrary to the holding in *Superguide v. DIRECTV*, 358 F3d 870, 69 USPQ2d 1865 (Fed. Cir. 2004).

The invention claimed is:

1. A controller for a vehicle, the controller comprising:
 a computing apparatus to operate,
  a control program to control a vehicle function among vehicle functions, and
  a test environment with a control test program to test a plurality of program elements respectively corresponding to a vehicle function among the vehicle functions,
  the test environment is defined within a delimited runtime environment that is delimited from the control program,
  the control test program includes a program interface to link and execute least one program element among the plurality of program elements of a vehicle function among the vehicle functions in a runtime of the control test program to test the at least one program element of the vehicle function; and
 a communication device to provide a wireless communication connection to the test environment;
 the control test program is to,
  recognize a vehicle status in data of the vehicle functions, and
  obtain, via the wireless communication connection, at least one defined program element among the plurality of program elements that is associated with the vehicle status to link and execute the at least one defined program element associated with the vehicle status, in the runtime of the control test program to test the at least one defined program element associated with the vehicle status.

2. The controller as claimed in claim 1, wherein the control test program only has read access to the vehicle function.

3. The controller as claimed in claim 1, wherein the test environment is created virtually within the computing apparatus by the delimited runtime environment, while the delimited runtime environment has no effect on a runtime environment of the control program.

4. The controller as claimed in claim 1, wherein the control test program includes an event detector to recognize a defined test condition in data of the vehicle functions, and to start at least one program element among the plurality of program elements of the control test program on recognition of the defined test condition.

5. The controller as claimed in claim 1, wherein the computing apparatus has a computing unit dedicated to the test environment.

6. The controller as claimed in claim 1, wherein,
 test data ascertained by the control test program is saved in the test environment, and
 the test environment is to provide the test data to the communication device for transmission to an evaluation device outside the vehicle.

7. A method of testing a program element among a plurality of program elements of a vehicle function among vehicle functions in which a control program to control the vehicle functions is provided, the method comprising:

running a test environment with a control test program that is delimited from the control program, linking and executing, through a program interface of the control test program, at least one program element among the plurality of program elements of a vehicle function among the vehicle functions into a runtime of the control test program, testing, by the at least one program element executing, the vehicle function, establishing, by a communication device, a wireless communication connection to the test environment, and by the control test program, recognizing a vehicle status in data of the vehicle functions, and obtaining, via the wireless communication connection, at least one defined program element among the plurality of program elements that is associated with the vehicle status to link and execute the at least one defined program element associated with the vehicle status, in the runtime of the control test program to test the at least one defined program element associated with the vehicle status.

8. A motor vehicle, comprising:

a controller including, a computing apparatus to operate, a control program to control a vehicle function among vehicle functions, and a test environment with a control test program to test a plurality of program elements respectively corresponding to a vehicle function among the vehicle functions, the test environment is defined within a delimited runtime environment that is delimited from the control program;

the control test program includes a program interface to link and execute at least one program element among the plurality of program elements of a vehicle function among the vehicle functions in a runtime of the control test program to test the at least one program element of the vehicle function; and a communication device to provide a wireless communication connection to the test environment;

the control test program is to, recognize a vehicle status in data of the vehicle function, and obtain, via the wireless communication connection, at least one defined program element among the plurality of program elements that is associated with the vehicle status to link and execute the at least one defined program element associated with the vehicle status, in the runtime of the control test program to test the at least one defined program element associated with the vehicle status.

9. The motor vehicle as claimed in claim 8, wherein the control test program only has read access to the vehicle function.

10. The motor vehicle as claimed in claim 8, wherein the test environment is created virtually within the computing apparatus by the delimited runtime environment, while the delimited runtime environment has no effect on a runtime environment of the control program.

11. The motor vehicle as claimed in claim 8, wherein the control test program includes an event detector to recognize a defined test condition in data of the vehicle function, and to start at least one program element among the plurality of program elements of the control test program on recognition of the defined test condition.

12. The motor vehicle as claimed in claim 8, wherein the computing apparatus has a computing unit dedicated to the test environment.

13. The motor vehicle as claimed in claim 8, wherein, test data ascertained by the control test program is saved in the test environment, and the test environment is to provide the test data to the communication device for transmission to an evaluation device outside the motor vehicle.

\* \* \* \* \*